Figure 1:
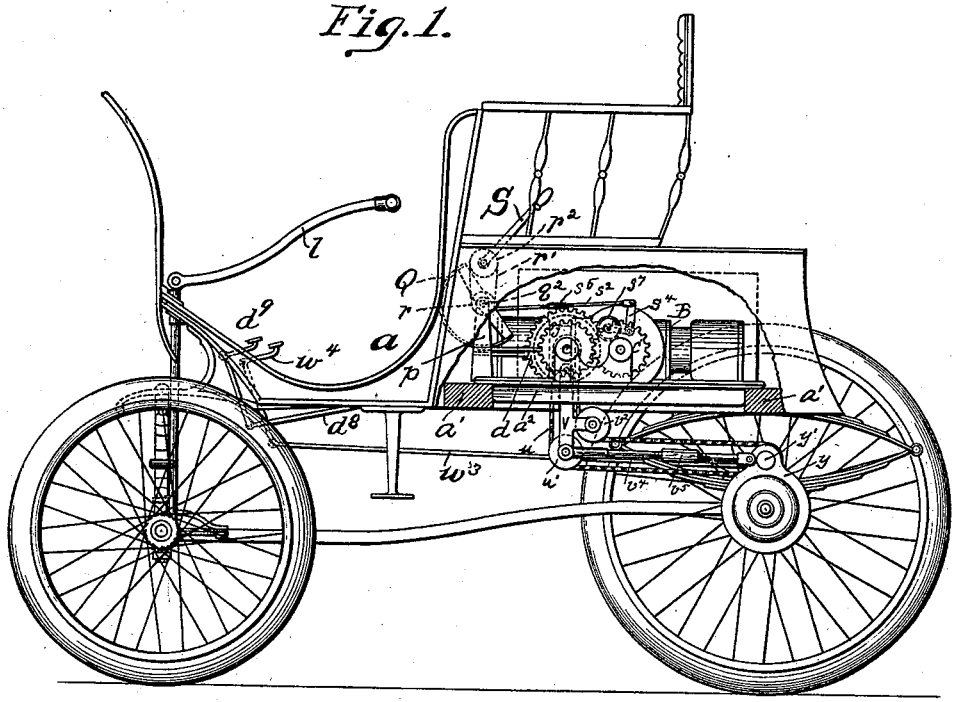

No. 653,501. Patented July 10, 1900.
L. S. CLARKE, W. MORGAN & J. G. HEASLET.
MOTOR VEHICLE.
(Application filed Jan. 31, 1899.)
(No Model.) 5 Sheets—Sheet 1.

No. 653,501. Patented July 10, 1900.
L. S. CLARKE, W. MORGAN & J. G. HEASLET.
MOTOR VEHICLE.
(Application filed Jan. 31, 1899.)
(No Model.) 5 Sheets—Sheet 2.

No. 653,501. Patented July 10, 1900.
L. S. CLARKE, W. MORGAN & J. G. HEASLET.
MOTOR VEHICLE.
(Application filed Jan. 31, 1899.)
(No Model.) 5 Sheets—Sheet 3.

No. 653,501. Patented July 10, 1900.
L. S. CLARKE, W. MORGAN & J. G. HEASLET.
MOTOR VEHICLE.
(Application filed Jan. 31, 1899.)

(No Model.) 5 Sheets—Sheet 4.

No. 653,501. Patented July 10, 1900.
L. S. CLARKE, W. MORGAN & J. G. HEASLET.
MOTOR VEHICLE.
(Application filed Jan. 31, 1899.)
(No Model.) 5 Sheets—Sheet 5.
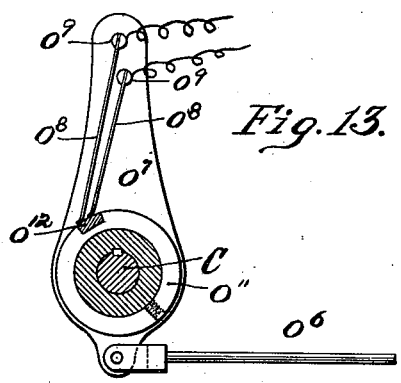
Fig. 13.
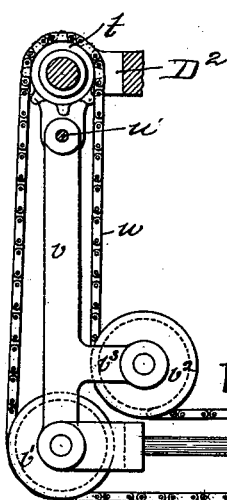
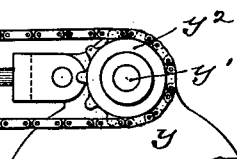
Fig. 14.
Witnesses:
Inventors:

UNITED STATES PATENT OFFICE.

LOUIS S. CLARKE AND WILLIAM MORGAN, OF PITTSBURG, AND JAMES G. HEASLET, OF ALLEGHENY, PENNSYLVANIA, ASSIGNORS, BY MESNE ASSIGNMENTS, TO THE AUTOCAR COMPANY, OF PENNSYLVANIA.

MOTOR-VEHICLE.

SPECIFICATION forming part of Letters Patent No. 653,501, dated July 10, 1900.

Application filed January 31, 1899. Serial No. 703,968. (No model.)

*To all whom it may concern:*

Be it known that we, LOUIS S. CLARKE and WILLIAM MORGAN, residents of Pittsburg, and JAMES G. HEASLET, a resident of Allegheny, in the county of Allegheny, State of Pennsylvania, have invented a new and useful Improvement in Motor-Vehicles; and we do hereby declare the following to be a full, clear, and exact description thereof.

Our invention relates to motor-vehicles.

One of the objects of our invention is to simplify the construction of the mechanism for controlling the speed of such vehicles, so that the speed of the motor and the high and low gear driven thereby may be controlled by one and the same lever.

A further object of our invention is to provide for the take-up of the driving-chain when vibration or jolting of the vehicle occurs, which would tend to cause it to relax or sag and throw the motor on a strain.

A further object of our invention is to provide for the mounting of the mechanism on the vehicle in such a manner that for the purposes of repair, &c., the entire mechanism may be lifted from the vehicle as one piece and replaced in the same form.

Our invention comprises, generally stated, a motor, high and low speed gear driven by said motor, mechanism for throwing the high or low speed gear into operation and at the same time controlling the speed of the motor, and a single lever by the movement of which said mechanism is operated.

Our invention further comprises a chain-take-up device consisting of a swinging frame composed of hinged sections interposed between the drive sprocket-wheels and guide-rollers on said frame for the chain, whereby the frame remains of unvarying length, and so keeps the chain taut; but at the same time its hinged joint will permit it to yield sufficiently to accommodate itself to the vibrations and jolts of the vehicle.

To enable others skilled in the art to make and use our invention, we will describe the same more fully, referring to the accompanying drawings, in which—

Figure 2:
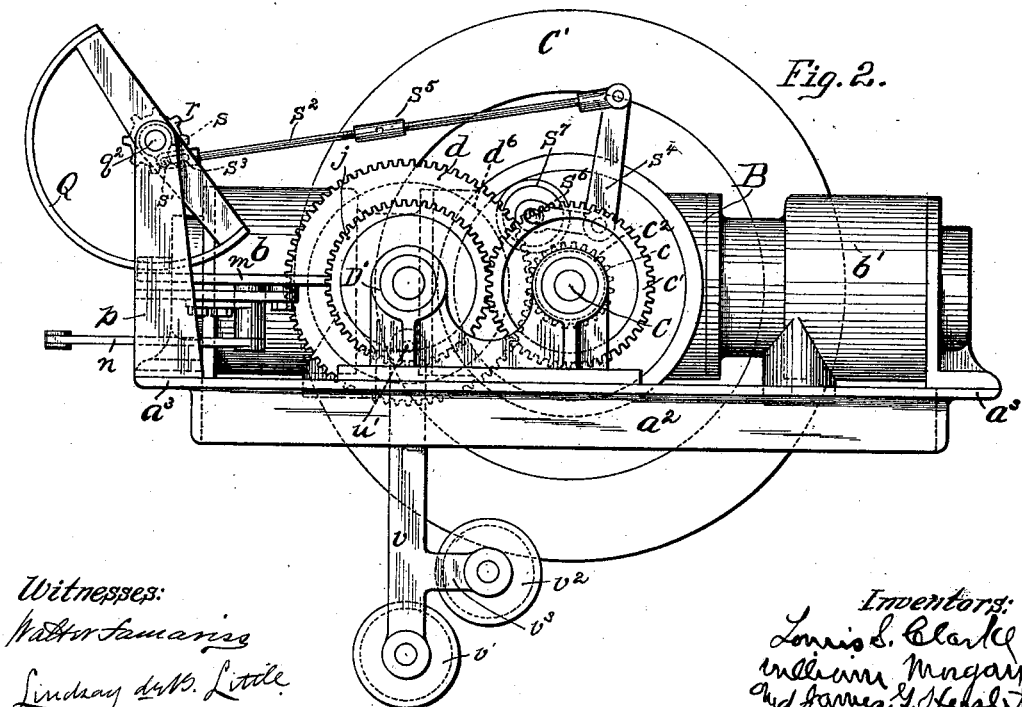
Figure 3:
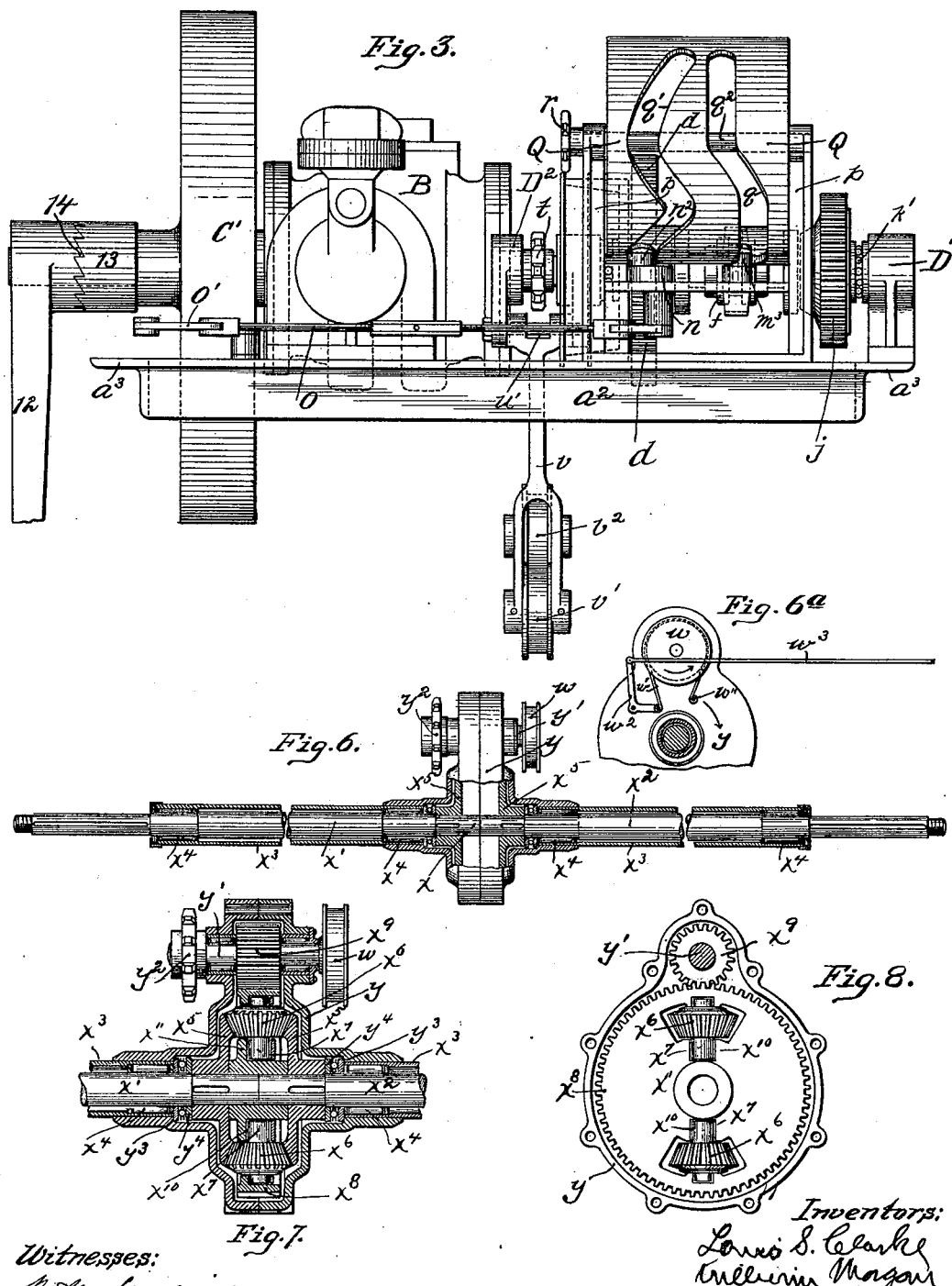
Figure 4:
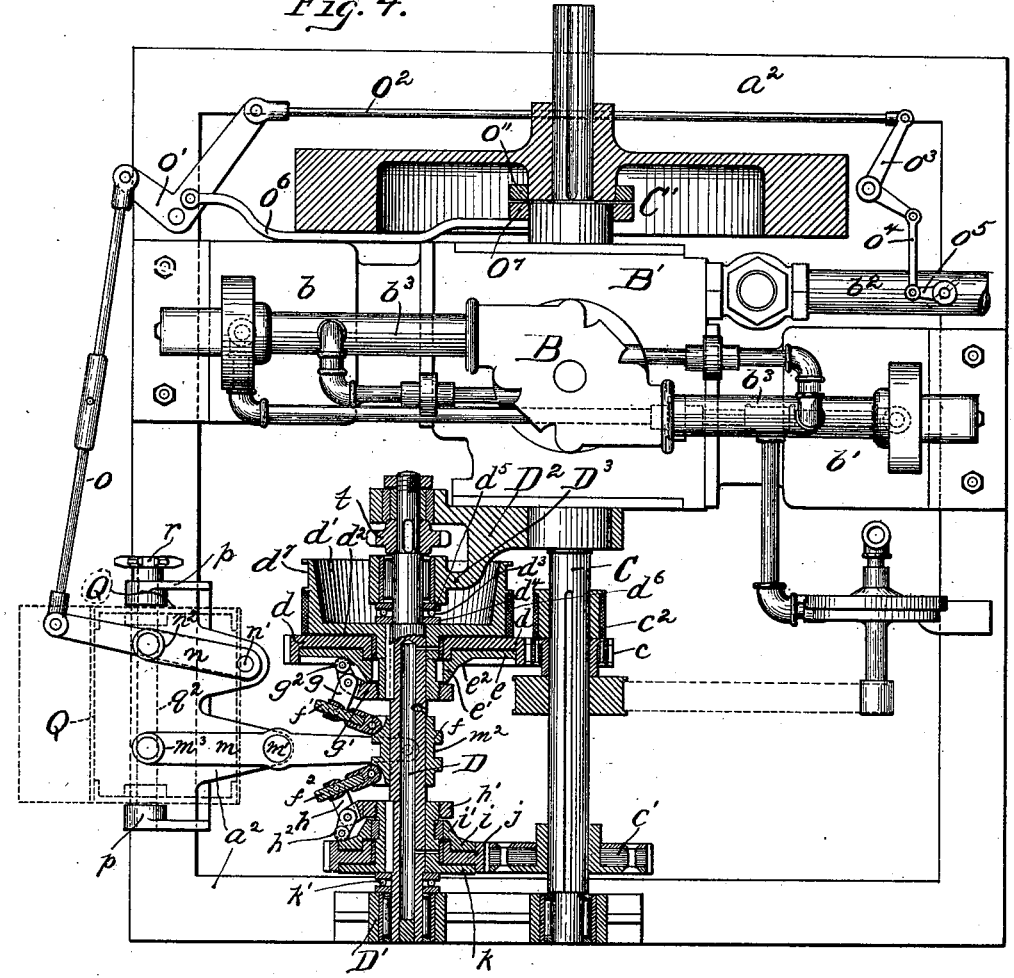
Figure 5:
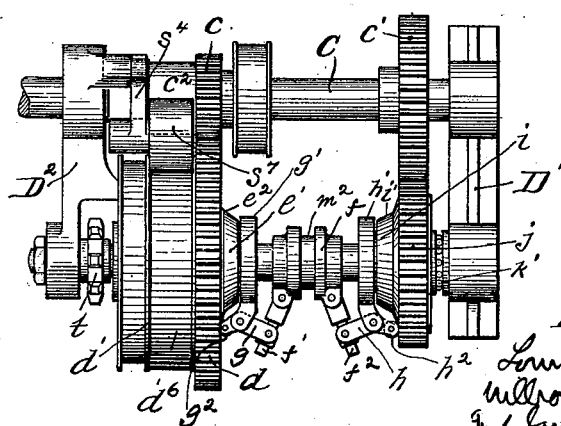

Figure 1 is a side view of a suitable vehicle with our invention applied thereto. Fig. 2 is an enlarged side view of the gear mechanism and the device for throwing said gear mechanism into and out of operation. Fig. 3 is an enlarged end view of same. Fig. 4 is a plan view, partly in section. Fig. 5 is a detail plan view of the clutch mechanism for throwing the high and low speed gear into operation. Fig. 6 is a longitudinal section of the rear axle. Fig. $6^a$ is a view of band-brake on chain-shaft. Fig. 7 is a view of the compensating gear for the rear axle. Fig. 8 is a face view of same. Figs. 9, 10, 11, and 12 are diagrammatic views of the different positions of the high and low speed and the motor-controlling device. Fig. 13 is a detail view of the sparking device. Fig. 14 is an enlarged side view of the chain-take-up device.

Like characters of reference indicate like parts in each view.

In Fig. 1 of the drawings is represented a four-wheeled vehicle of suitable construction, in connection with which our invention is illustrated and described; but as said vehicle forms no part of our invention it is not deemed necessary to describe it in detail. The rear portion of said vehicle beneath the seat is boxed in, as shown in Fig. 1, to inclose the motor and other mechanism, so that all the parts are protected and hidden from view.

The body $a$ has the cross-beams $a'$, which support the frame $a^2$. This frame $a^2$ is made up of angle-bars and has the front and rear flanges $a^3$, which rest upon the cross-beams $a'$ and to which said frame is secured. The motor, the gear mechanism, and other parts hereinafter referred to are mounted on this frame $a^2$, so that when said frame is released from the body $a$ the said frame can be lifted therefrom with all the working parts, which is a great matter of convenience in construction and repair work. A suitable motor B is carried by the frame $a^2$, the one illustrated having two cylinders $b\ b'$ with pistons therein, which move together in opposite directions. As the motor B is an explosive-engine, the pipe $b^2$ conveys the gaseous mixture to the mixing-chamber B', whence it is admitted to the cylinders $b\ b'$, to be properly ignited to operate the pistons. The cylinders are provided with the customary water-jackets and pipes $b^3$, leading to and from same, whereby a constant circulation is maintained. As this motor forms no part of our invention, it will not require a further description, it being apparent that any suitable form of motor may be employed, whether of the explosive-engine type or some other. The shaft C is the motor or main shaft, which is mounted in suitable bearings on the frame $a^2$ and carries the fly-wheel C'. Keyed to the shaft C is the pinion $c$ and the gear-wheel $c'$. Parallel with the shaft C is the counter-shaft D, which is journaled at one end in the bearing D' of the frame and at the other end in the bracket-arm $D^2$ on the motor-body. The pinion $c$ meshes with the gear-wheel $d$, loosely mounted on the shaft D. A friction-drum $d'$ is secured to the shaft D, with its friction-face $d^2$ in close proximity to one face of the gear-wheel $d$. A ball-bearing is provided for the friction-drum $d'$, the balls $d^3$ being interposed between a collar $d^4$ on said drum and the bushing $d^5$, held within the arm $D^3$ of the bracket $D^2$. The friction-drum $d'$ has the band-brake groove $d^7$, adapted to receive the ordinary band for braking the shaft D, said band-brake to be operated by the rod $d^8$, connected up to the foot-lever $d^9$. On the opposite side of the gear-wheel $d$ is the friction-disk $e$, adapted to slide on a key on said shaft D. This disk $e$ has the boss $e'$, with the beveled face $e^2$. A sleeve $f$ is mounted to slide on the shaft D, said sleeve having levers $f'$ $f^2$ pivoted thereto at opposite ends. The lever $f'$ is connected to the bell-crank $g$ on the collar $g'$, screwed onto the disk $e$. In the outer arm of the bell-crank $g$ is the roller $g^2$, adapted to move in contact with the beveled face $e^2$ of the disk $e$. The lever $f^2$ is likewise connected to a bell-crank $h$ on a collar $h'$ on the slidable friction-disk $i$, the outer arm of said bell-crank having a roller $h^2$, adapted to move in contact with the beveled face $i'$ on the outer face of said disk $i$. The inner face of said disk $i$ is in close proximity with the inner face of the gear-wheel $j$, loosely mounted on the shaft D. The outer face of said disk gear-wheel $j$ is adapted to engage by frictional contact the disk $k$, rigidly secured to the shaft D. Ball-bearings $k'$ are provided for said disk. A lever $m$ is pivoted to the frame $a^2$ at $m'$, the outer forked end of said lever engaging the annular groove $m^2$ in the slidable sleeve $f$. At the other end of the lever $m$ is the stud $m^3$. A second lever $n$ is pivoted at $n'$, said lever having the stud $n^2$ intermediate of its length. The outer end of said lever $n$ is connected by the rod $o$ to the bell-crank $o'$, said bell-crank in turn being connected by the rod $o^2$ to the bell-crank $o^3$. A link $e^4$ connects said bell-crank $o^3$ to the valve-lever $o^5$. This valve-lever operates a suitable valve (shown in dotted lines, Fig. 4) in the pipe $b^2$. Branching off from the bell-crank $o'$ and operated by same is the rod $o^6$, which, as shown in Fig. 13, is connected to the lower end of the arm $o^7$, which encircles the motor-shaft C. The brushes $o^8$ are secured to this arm and the terminals $o^9$ are connected to said brushes. Around the hub $o^{10}$ is the insulating-ring $o^{11}$, with the contact-block $o^{12}$ embedded therein. It is apparent that by the movement of the rod $o^6$ the arm $o^7$ will be moved and the position of the brushes with reference to the contact-block $o^{12}$ changed, whereby the increase or decrease of the lead of the spark is obtained. Journaled in uprights $p$ on the frame is the device by means of which the levers $m$ $n$ are operated. This device consists of a movable member with slots or guides formed therein, adapted to engage the studs on said levers in such a manner as to move said levers in different directions, according to the speed to be imparted to the vehicle. The movable member illustrated in this form of our invention consists of a rocker-frame Q, trunnioned in said uprights $p$. The rocker-frame is semicylindrical in form and has slots or guides $q$ $q'$ therein. The studs $m^3$ $n^2$ engage these slots $q$ $q'$, respectively, and the direction that said studs take is regulated by the shapes of said slots. A sprocket-wheel $r$ is secured to one end of the shaft $q^2$, and an endless chain $r'$ engages said sprocket $r$ and a second sprocket $r^2$. An operating-lever S is connected to the sprocket $r^2$, so that by the movement of said lever the rocker-frame Q is rocked to impart movement to the levers $m$ $n$. On a collar $s$ on the shaft $q^2$ is the stud $s'$. A rod $s^2$ has a slot $s^3$, adapted to engage the stud $s'$. The opposite end of said rod is connected to the bell-crank $s^4$. The rod $s^2$ is provided with the turnbuckle $s^5$. The bell-crank $s^4$ is connected to the shaft $s^6$, which carries the reversing-roller $s^7$. This reversing-roller has its surface covered with leather or other suitable material, and when the lever S is thrown back to its fullest extent the roller $s^7$, through the connection described, is thrown into frictional contact with the frictional face $d^6$ on the drum $d'$ and the frictional face $c^2$ on the pinion $c$, whereby the movements of the parts are reversed and the vehicle travels backward. A sprocket-wheel $t$ is carried by the shaft D, and around this sprocket the drive-chain $u$ passes. Suspended from the bolt $u'$ is the chain take-up V. This take-up is composed of the pendent arm $v$, at the lower end of which is the idle roller $v'$. A second idle roller $v^2$ is carried by the lug $v^3$, projecting out from said arm $v$. Pivoted to the lower end of the arm $v$ is a rod $v^4$, the opposite end of said rod being pivoted to the casing $y$, which contains the compensating mechanism, or to any other convenient stationary part. On the short shaft $y'$ in the upper portion of the casing $y$ is the sprocket-wheel $y^2$. The drive-chain $u$ passes, as stated, around the sprocket $t$, thence down to the idle rollers $v'$ $v^2$, and around the sprocket $y^2$. The rod $v^4$ has the turnbuckle $v^5$ for reducing or increasing the length of said rod. Suitable pulleys may be substituted for the sprockets $t$ and $y^2$ and a belt for said chain $u$. By the use of this chain take-up it is apparent that no matter what position the body of the vehicle may take through vibration or jolting of same the drive-chain will always be held taut, as the take-up remains constant in length no matter how much it may swing on its pivots.

The rear axle $x$ is made in two sections $x'$ $x^2$, said sections being contained within suitable tubing $x^3$, connected to the casing $y$, hereinbefore referred to. The axle is also provided with roller-bearings $x^4$. Secured to the inner ends of the sections $x'$ $x^2$ are the bevel-gears $x^5$, and at right angles thereto and meshing therewith are the bevel-pinions $x^6$, with trunnions $x^7$. These bevel-pinions $x^6$ have their trunnions $x^7$ mounted in bearings $x^{10}$ in the gear-wheel $x^8$, the web $x^{11}$ of said gear-wheel being cast with said bearings $x^{10}$ therein. The bearings $x^{10}$ are babbitted to receive said trunnions. The casing $y$ is formed in two sections, which are bolted together and which act to hold the inclosed parts together. By removing the bolts the inclosed parts are exposed and access is readily had for purposes of repair, &c. Each section of the casing has a shoulder $y^3$, against which the washers $y^4$ of the ball-bearings rest when the sections are secured together. These shoulders act to take the end thrust of the sections $x'$ $x^2$ of the axle.

On the shaft $y'$ is the band-brake wheel $w$, with the band $w'$ secured to the casting $y$ at $w''$ and to the bell-crank $w^2$. A rod $w^3$ operates said brake, said rod being connected to a foot-lever $w^4$. In case the driving-chain should break the band-brake operated by rod $d^8$ would prove useless; but the band-brake $w'$ would act to brake the rear axle in such an emergency. This would also apply where the band-brake operated by the rod $d^8$ should fail to operate. The gear-wheel $x^8$ is secured to the axle $x$, said gear meshing with the pinion $x^9$ on the shaft $y'$.

The lever $z$ operates the steering-gear, which forms no part of our invention.

Figure 9:
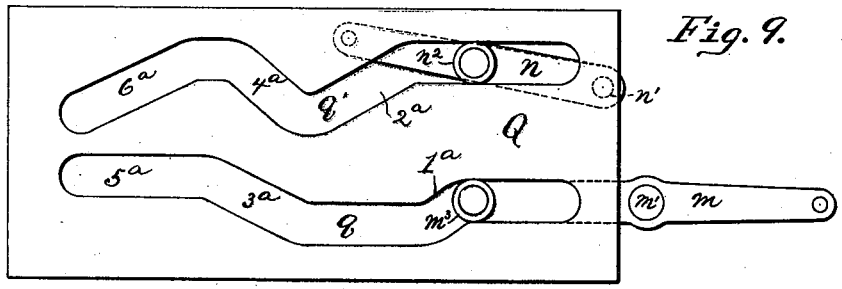
Figure 10:
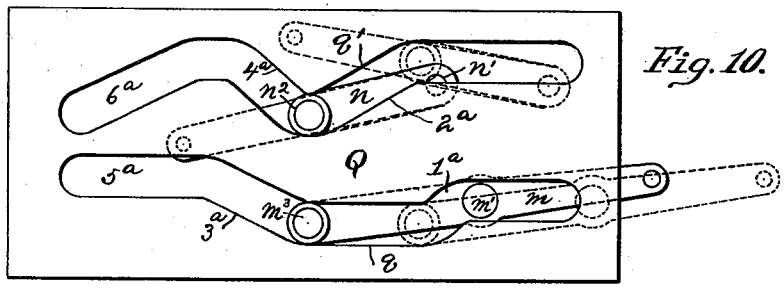
Figure 11:
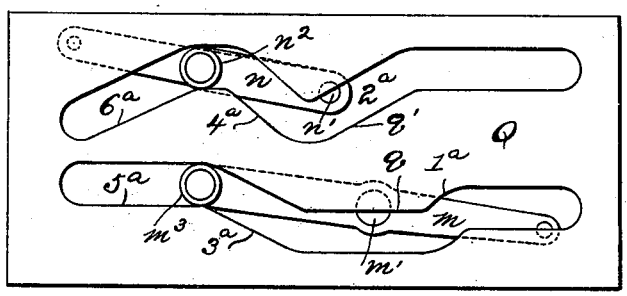
Figure 12:
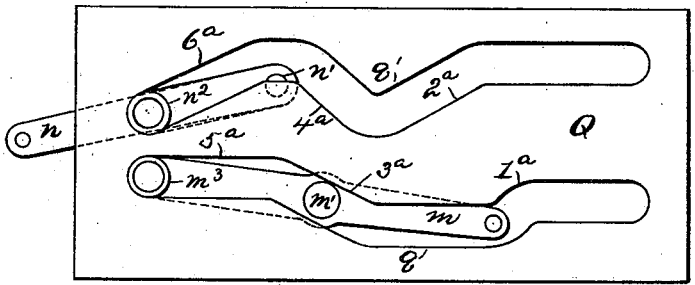

When our improved motor-vehicle is in use, its operation is as follows: When said vehicle is at rest, the parts will be in the position shown in Figs. 1 and 4. In order to start the motor, a crank 12 may be attached to the motor-shaft C, said shaft having a ratchet-collar 13 thereon, with which corresponding teeth 14 on the crank 12 engage. By turning the crank the motor draws in the explosive mixture to its piston-chambers, where it is ignited, and after a few turns of said crank the motor continues to operate without further aid. As long as the vehicle remains at a standstill the shaft C simply revolves together with the fly-wheel C', pinion $c$ meshing with loose gear-wheel $d$ on shaft D and gear-wheel $c'$ meshing with loose gear-wheel $j$ on shaft D. When, however, it is desired to advance the vehicle, the operator grasps the lever S and forces it forward. This acts to move the rocker-frame Q. In Figs. 9, 10, 11, and 12 we have illustrated in diagrammatic form the different positions said rocker-frame may assume with reference to the studs $m^3$ $n^2$ on the levers $m$ $n$. Referring then to Fig. 9, as the operator carries the lever S forward no movement will be imparted to the levers $m$ $n$ until the stud $m^3$ enters the bend $1^a$ in the slot $q$ and the stud $n^2$ enters the bend $2^a$ in the slot $q'$, as shown in dotted lines in Fig. 10. The levers will be moved to the position shown in Fig. 10, the studs $m^3$ $n^2$ taking the position shown in full lines in said figure, the movement of lever $m$ having thrown the sleeve $f$ over, so that the disk $e$ has been thrown into contact with the gear-wheel $d$ and said gear-wheel in turn into contact with the drum $d'$. As the gear-wheel $d$ is driven by the pinion $c$, motion is now imparted to the shaft D and through the driving mechanism to the rear wheels of the vehicle. The lever $n$ has also been moved, as shown, its outer end drawing on the rod $o$ and through the connecting parts acting to open wider the valve in the supply-pipe $b^2$. We now have the low-speed gear in operation, which gives slow movement to vehicle and "high motor" or the motor running at full speed. As we now have high motor, it is desirable to increase the lead of the spark. As the lever $n$ moves the rod $o^2$ it also moves the rod $o^6$ to operate the arm $o^7$, which increases the lead of the spark, and the explosion takes place earlier. This change of speed of the motor may be accomplished solely by the change in the lead of the spark, even though no valve is employed to control the amount of the gas entering the cylinder of the motor. By a further movement of the lever S the studs $m^3$ $n^2$ enter the bends $3^a$ $4^a$, respectively, of the slots $q$ $q'$. In Fig. 11 said studs have been acted on by said bends $3^a$ $4^a$, and the movement that the levers have received thereby is illustrated. The lever $m$ has been moved to throw the sleeve $f$ in the opposite direction, so that the disk $i$ has carried the gear-wheel $j$ into contact with the disk $k$. The shaft D is now driven by the gear-wheel $c'$, meshing with gear-wheel $j$, and we have high-speed gear, while at the same time the lever $n$ has been so moved as to partly close the valve in pipe $b^2$, and we have "low motor." By a still further movement of the lever S the studs $m^3$ $n^2$ enter the bends $5^a$ $6^a$, respectively, of the slots $q$ $q'$, as shown in Fig. 12. This brings the studs to the ends of the slots and brings the levers $m$ $n$ into such position that the high-speed gear still remains in operation, while the rod $o$ is moved to open wide the valve in pipe $b^2$. We have then the maximum speed of the vehicle with the high-speed gear and high motor. All the above-described changes in speed are obtained by the movement of a single lever in the same direction, so that the operator can with one hand control the speed of the vehicle. Furthermore, the vehicle is reversed by the same lever, for by throwing said lever S back beyond the point where it stands when the vehicle is at a standstill the stud $s'$ on the collar $s$ will draw the rod $s^2$ forward and throw the roller $s^7$ into contact with the face $d^6$ of drum $d'$ and the drum $c^2$. This will act to reverse the driving mechanism and cause the wheels of the vehicle to move backward. When the vehicle is running in a straight course, the bevel-gears $x^5 x^6$ remain at a standstill; but when a turn is made the outside wheels of the vehicle travel faster than the inside, due to the fact that the bevel-gears $x$ revolve and permit of this action.

While we have described the moving member which operates the levers $m\ n$ as a rocker-frame and as semicylindrical in form, yet it is apparent that said moving member might consist of a flat plate with suitable slots or guides therein engaging the studs on said levers.

It is apparent that the other parts of the apparatus may be modified and changed without affecting the spirit of our invention.

By "motor-controlling device," as used in the claims, we mean the device for increasing the lead of the spark or the valve for controlling the amount of explosive mixture to the motor or any other device for controlling the speed of the motor.

What we claim as our invention, and desire to protect by Letters Patent, is—

1. In a motor-vehicle, the combination with a motor, a shaft, a counter-shaft, and high and low gear connections between said shafts, of a motor-controlling device, means for setting the high or the low speed gear and operating said motor-controlling device simultaneously, an operating-lever and connections between the same and said gear-setting means embodying a lever and a controlling-guide for setting both gears by a one-way movement of the operating-lever, substantially as set forth.

2. In a motor-vehicle, the combination with a shaft, a counter-shaft, and high and low speed gear connections between said shafts, of a motor-controlling device, means for setting the high or the low speed gear and operating said motor-controlling device simultaneously, a single operating-lever and connections between said means and said operating-lever, embodying cam-and-lever mechanism for setting said gears and operating the motor-controlling device for all speeds by a one-way movement of the operating-lever, substantially as set forth.

3. In a motor-vehicle, a motor, a shaft, a counter-shaft, high and low gear connections between said shafts, a valve controlling the admission of explosive mixture to said motor, a device for changing the lead of the spark, a lever, and connections between said lever and said valve and a device for changing lead of spark, substantially as set forth.

4. In a motor-vehicle, a motor, a shaft, a counter-shaft, high and low speed gear connections between said shafts, clutch mechanism on said counter-shaft, a clutch-operating lever, a motor-controlling device, a lever, connections between said last-mentioned lever and motor-controlling device, and a movable governing member engaging said levers, and by its traverse in one direction serving to move said levers to give low gear and low motor, low gear and high motor, high gear and low motor, or high gear and high motor, and all intermediate speeds on each gear, substantially as set forth.

5. In a motor-vehicle, a motor, a shaft, a counter-shaft, high and low speed gear connections between said shafts, clutch mechanism on said counter-shaft, a clutch-operating lever, a motor-controlling device, a lever, connections between said last-mentioned lever and motor-controlling device, and a movable member having irregular-shaped guides adapted to engage projections on said levers, substantially as set forth.

6. In a motor-vehicle, a motor, a shaft, a counter-shaft, high and low speed gear connections between said shafts, clutch mechanism on said counter-shaft, a clutch-operating lever, a motor-controlling device, a lever, connections between said last-mentioned lever and said motor-controlling device, a rocker-frame having irregular-shaped guides therein adapted to engage projections on said levers, substantially as set forth.

7. In motor-vehicles, a motor, a shaft, a counter-shaft, high and low speed gear connections between said shafts, clutch mechanism on said counter-shaft, a clutch-operating lever, a motor-controlling device, a lever, connections between said last-mentioned lever and motor-controlling device, a semicylindrical rocker-frame having irregular-shaped guides therein adapted to engage projections on said levers, and a single operating-lever for moving said rocker-frame, substantially as set forth.

8. In motor-vehicles, a motor, a shaft, a counter-shaft, high and low speed gear connections between said shafts, clutch mechanism on said counter-shaft, a clutch-operating lever, a motor-controlling device, a lever, connections between said last-mentioned lever and motor-controlling device, a semicylindrical rocker-frame having irregular-shaped guides therein adapted to engage projections on said levers, a sprocket-wheel on the rocker-frame shaft, a chain connecting said sprocket-wheel, and an operating-lever connected to said last-mentioned sprocket, substantially as set forth.

9. In a motor-vehicle, a motor, a shaft, a counter-shaft, high and low speed gear connections between said shafts, clutch mechanism on said counter-shaft, a clutch-operating lever, a motor-controlling device, a lever, connections between said lever and the motor-controlling device, a rocker-frame having irregular-shaped guides therein adapted to engage projections on said levers, a friction-roller adapted to engage frictional faces on said shafts, and connections between said roller and said rocker-frame, whereby by the movement of said rocker-frame said roller is thrown into contact with said shafts, substantially as set forth.

10. In a motor-vehicle, a motor, a shaft, a counter-shaft, high and low speed gear connections between said shafts, clutch mechanism on said counter-shaft, a clutch-operating lever, a motor-controlling device, a lever, connections between said lever and the motor-controlling device, a rocker-frame having irregular-shaped guides therein adapted to engage projections on said levers, a friction-roller adapted to engage frictional faces on said shafts, a bell-crank connected to said roller, and a rod connected to said bell-crank, the opposite end of said rod having a slot therein engaging a stud on said rocker-frame, substantially as set forth.

11. In a motor-vehicle, a motor, a shaft, a counter-shaft, high and low speed gear connections between said shafts, clutch mechanism on said counter-shaft, a clutch-operating lever, a motor-controlling device, a lever, connections between said lever and the motor-controlling device, a rocker-frame having irregular-shaped guides therein adapted to engage projections on said levers, a friction-roller adapted to engage frictional faces on said shafts, a bell-crank connected to said roller, and a rod connected to said bell-crank the opposite end of said rod having a slot therein engaging a stud on said rocker-frame, a sprocket-wheel on the rocker-frame shaft, a chain connecting said sprocket-wheel with a second sprocket-wheel, and a lever adapted to turn said second sprocket-wheel, substantially as set forth.

12. In a motor-vehicle, a power-driven wheel, an endless belt, a second wheel adapted to drive the axle, said belt engaging said wheels, and a swinging take-up frame between said wheels with which said belt engages, substantially as set forth.

13. In a motor-vehicle, a power-driven sprocket-wheel, an endless chain, a second sprocket-wheel adapted to drive the axle, said chain engaging said sprocket-wheels, a swinging take-up frame between said sprocket-wheels, and rollers on said frame with which said chain engages, substantially as set forth.

14. In a motor-vehicle, a power-driven sprocket-wheel, an endless chain, a second sprocket-wheel adapted to drive the axle, said chain engaging said sprocket-wheels, a swinging arm suspended below said first-mentioned sprocket-wheel, a rod pivoted to said arm and to a point adjacent to said second-mentioned sprocket-wheel, and rollers on said swinging arm with which said chain engages, substantially as set forth.

15. In a motor-vehicle, a power-driven sprocket-wheel, an endless chain, a second sprocket-wheel adapted to drive the axle, said chain engaging said sprocket-wheels, a swinging arm suspended below said first-mentioned sprocket-wheel, a rod pivoted to said arm and to a point adjacent to said second-mentioned sprocket-wheel, said rod having a turnbuckle therein, and rollers on said swinging arm with which said chain engages, substantially as set forth.

16. In a motor-vehicle, the combination with a motor, a shaft, a counter-shaft, and high and low speed gear connections between said shafts, of a slidable sleeve on said counter-shaft, mechanism for moving said sleeve, an arm pivoted to said sleeve, a bell-crank on said counter-shaft having one end connected to said arm, and a clutch member movable longitudinally of the shaft by the engagement of the free end of the bell-crank therewith, substantially as set forth.

17. In a motor-vehicle, a motor, a shaft, a counter-shaft, high and low speed gear connections between said shafts, a slidable sleeve on said counter-shaft, mechanism for moving said sleeve, an arm pivoted to said sleeve, a bell-crank on said counter-shaft connected to said arm and having a roller at its free end and a friction-disk member of a clutch on said counter-shaft, with the outer face of which the roller on the end of said bell-crank engages, substantially as set forth.

18. In a motor-vehicle, a motor, a shaft, a counter-shaft, high and low speed gear connections between said shafts, a slidable sleeve on said counter-shaft, mechanism for moving said sleeve, an arm pivoted to said sleeve, a bell-crank on said counter-shaft connected to said arm, a friction-disk member of a clutch mounted on said counter-shaft, said disk having a beveled outer face with which the free end of the bell-crank engages, substantially as set forth.

19. In a motor-vehicle, a motor, a shaft, a counter-shaft, high and low speed gear connections between said shafts, a slidable sleeve on said counter-shaft, mechanism for moving said sleeve, an arm pivoted to said sleeve, a bell-crank on said counter-shaft, connected to said arm, a friction-disk of a clutch on said counter-shaft, said disk having a beveled face thereon and a roller on said bell-crank adapted to move in contact with said beveled face, substantially as set forth.

20. In a motor-vehicle, the combination with a motor, a shaft driven thereby, a chain driven by said shaft, and a second shaft driven by said chain, of a band-brake on said second chain-shaft, and compensating-gear mechanism between said second chain-shaft and the vehicle-axle, substantially as set forth.

In testimony whereof we, the said LOUIS S. CLARKE, WILLIAM MORGAN, and JAMES G. HEASLET, have hereunto set our hands.

LOUIS S. CLARKE.
WILLIAM MORGAN.
JAMES G. HEASLET.

Witnesses:
ROBT. T. TOTTEN,
ROBERT C. TOTTEN.